US000001851H

United States Statutory Invention Registration [19]

[11] Reg. Number: H1,851

Kelley et al. [45] Published: Jun. 6, 2000

[54] MOTOR GRADER HAVING DUAL STEERING MECHANISMS

[75] Inventors: Craig B. Kelley, Dunlap; Matthew A. Hartman, Bloomington; Mark D. Shane, Princeville; Daniel E. Shearer, Metamora; Bernie D. Lunsford, Lowpoint, all of Ill.

[73] Assignee: Caterpillar Inc., Peoria, Ill.

[21] Appl. No.: 09/216,595

[22] Filed: Dec. 18, 1998

[51] Int. Cl.[7] ..... B60K 26/00

[52] U.S. Cl. ..... 180/333; 74/471 XY

[56] References Cited

U.S. PATENT DOCUMENTS

| | | | |
|---|---|---|---|
| 4,140,200 | 2/1979 | Tucek | 180/77 H |
| 4,158,968 | 6/1979 | Wilson et al. | 74/471 |
| 4,175,638 | 11/1979 | Christensen | 180/140 |
| 4,523,488 | 6/1985 | Ahrendt | 74/471 |
| 4,798,099 | 1/1989 | Alexander et al. | 74/473 |
| 4,978,273 | 12/1990 | Radke et al. | 414/697 |
| 5,360,312 | 11/1994 | Mozingo | 414/685 |
| 5,533,590 | 7/1996 | Steffen et al. | 180/332 |
| 5,553,992 | 9/1996 | Ashcroft | 414/685 |

*Primary Examiner*—Harold J. Tudor
*Attorney, Agent, or Firm*—Kevin M. Kercher

[57] ABSTRACT

A dual steering system for controlling the steering of a motor grader is disclosed. The first portion of the steering system comprises a steering wheel connected through a hydraulic steering valve to hydraulic right and left steering cylinders, which are connected to the right front tire and left front tire, respectively. Rotation of the steering wheel causes rotation of the front tires. A second portion of the steering system comprises a first button and a second button that are mounted to a control lever. Actuation of the first button sends a first electrical input signal and actuation of the second button sends a second electrical input signal to an electronic control computer. The electronic control computer generates control signals in response to the electrical input signals and transmits these control signals to a plurality of electro-hydraulic actuators. Actuation of an electro-hydraulic actuator by one of the control signals leads to actuation of the right steering cylinder and the left steering cylinder thereby causing rotation of the front wheels of the grader in one of two directions. Thus, the direction of travel of a motor grader can be controlled by one of two steering systems, one of which permits an operator to maintain contact with a control lever while adjusting the steering of the motor grader.

5 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MOTOR GRADER HAVING DUAL STEERING MECHANISMS

DESCRIPTION

1. Technical Field

This invention relates generally to a motor grader and specifically to a motor grader that includes dual steering controls.

2. Background Art

This invention relates generally to a motor grader that includes two mechanisms for controlling the steering of the motor grader.

Motor graders include many hand-operated controls to perform functions such as positioning an implement or a blade in several orientations, articulating the frame of the grader, and adjusting other grader settings. In most graders steering is accomplished by means of a steering wheel that acts through the hydraulic system of the motor grader.

Current motor graders require numerous hand-operated controls because typically each hand-operated control is used to control only one or two functions. Often, the operator of the motor grader must steer the grader while performing many other functions, such as adjusting the blade tip, adjusting the blade angle relative to the frame, and adjusting the articulation of the grader frame. Because the typical hand-operated controls are spaced apart, performing all of these functions while steering the vehicle is difficult, inefficient, and fatiguing for the operator. The operator must frequently remove one or both hands from the steering wheel to operate the other controls. To reduce difficulty, increase efficiency, and reduce operator fatigue, it is desirable to provide an apparatus that permits an operator to steer a motor grader without requiring the operator to release controls that control motor grader implements. Also it is desirable to provide an apparatus that is ergonomically advantageous for controlling both steering and these other functions.

3. Disclosure of the Invention

The present invention provides an efficient and ergonomic steering control system for a motor grader. The system permits the motor grader to be steered by one of two mechanisms that can be selected by the operator.

In a preferred embodiment, the steering mechanism comprises an electro-hydraulic control system and a control lever having a first button and a second button. The electro-hydraulic control system comprises an electronic control computer, a plurality of electro-hydraulic actuators, a hydraulic right steering cylinder associated with one of the plurality of electro-hydraulic actuators and a hydraulic left steering cylinder associated with another of the plurality of electro-hydraulic actuators. The hydraulic right steering cylinder and the hydraulic left steering cylinder are each connected to one of a pair of front tires of the motor grader. The first button transmits a first electronic input signal to the electronic control computer and the electronic control computer transmits a first control signal to the electro-hydraulic actuators associated with the hydraulic right steering cylinder and the hydraulic left steering cylinder in response to the first electronic input signal. The first control signal actuates the electro-hydraulic actuators associated with the hydraulic right steering cylinder and the hydraulic left steering cylinder, and the hydraulic right steering cylinder and the hydraulic left steering cylinder rotate the pair of front tires a first direction in response to actuation of the associated electro-hydraulic actuators by the first control signal. The second button transmits a second electronic input signal to the electronic control computer and the electronic control computer transmits a second control signal to the electro-hydraulic actuators associated with the hydraulic right steering cylinder and the hydraulic left steering cylinder in response to the second electronic input signal. The second control signal actuates the electro-hydraulic actuators associated with the hydraulic right steering cylinder and the hydraulic left steering cylinder and the hydraulic right steering cylinder and the hydraulic left steering cylinder rotate the pair of front tires a second direction in response to actuation of the associated electro-hydraulic actuators by the second control signal. The second direction is opposite to the first direction.

In a most preferred embodiment, the steering control system further includes a steering wheel hydraulically connected to the hydraulic right steering cylinder and the hydraulic left steering cylinder. Rotation of the steering wheel a first direction actuates the right steering cylinder and the left steering cylinder to rotate the pair of front tires the first direction. Rotation of the steering wheel a second direction actuates the right steering cylinder and the left steering cylinder to rotate the pair of front tires the second direction.

Thus, the present invention permits an operator to steer a motor grader while maintaining control of a control lever that is used to control other motor grader functions. In addition, the present invention permits the operator to utilize the steering wheel, as is typically done, when it is advantageous.

BEST MODE FOR CARRYING OUT THE INVENTION

Figure 1:
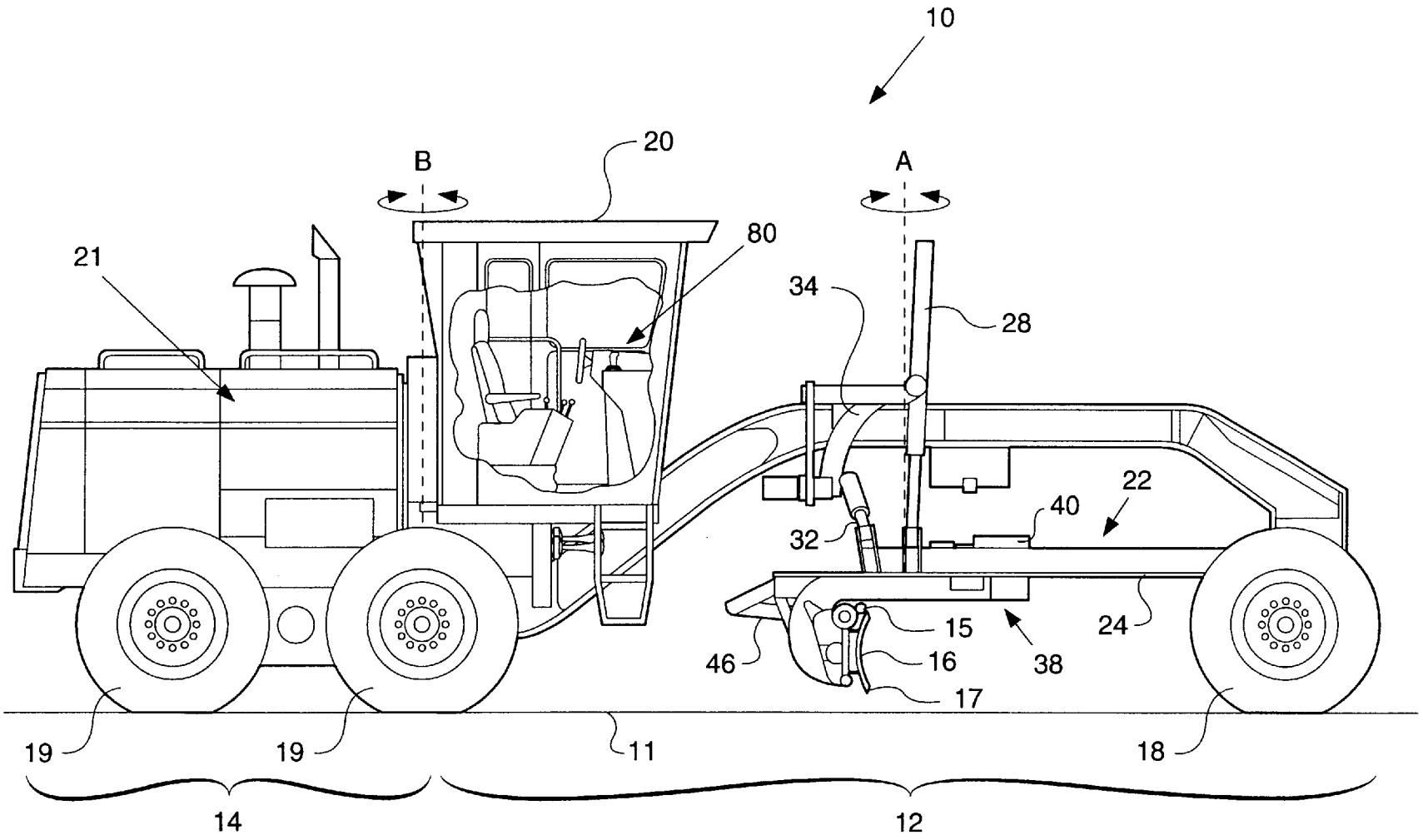
FIG. 1 is a side view of a motor grader.
Figure 2:
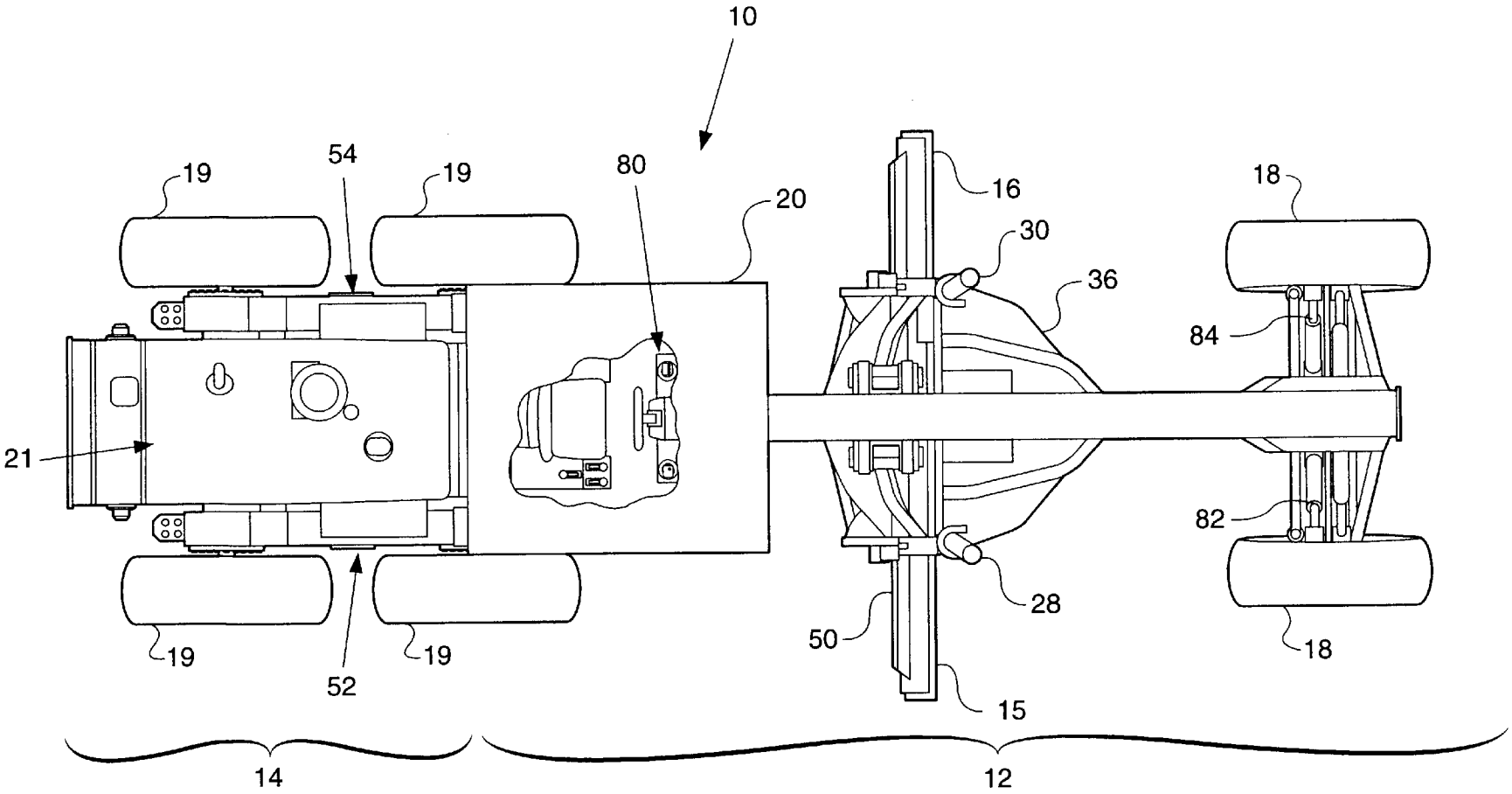
FIG. 2 is a top view of the motor grader.

Referring to the Figures, wherein like numerals indicate like or corresponding parts throughout the several views, a motor grader is shown generally at 10 in FIGS. 1 and 2. The motor grader 10 is used primarily as a finishing tool to sculpt a surface of earth 11 to a final arrangement. Rather than moving large quantities of earth in the direction of travel like other machines, such as a bulldozer, the motor grader 10 moves relatively small quantities of earth from side to side.

The motor grader 10 includes a front frame 12, a rear frame 14, and a blade 16 having a top 15 and a cutting edge 17. The front and rear frames 12 and 14 are supported by front tires 18 and rear tires 19. An operator cab 20 containing the many controls including a steering wheel 80 necessary to operate the motor grader 10 is mounted on the front frame 12. An engine, shown generally at 21, is used to drive or power the motor grader 10. The engine 21 is mounted on the rear frame 14. The blade 16, sometimes referred to as a moldboard, is used to move earth. The blade 16 is mounted on a linkage assembly shown generally at 22. The linkage assembly 22 allows the blade 16 to be moved to a variety of different positions with respect to the motor grader 10. Starting at the front of the motor grader 10 and working rearward toward the blade 16, the linkage assembly 22 includes a drawbar 24.

The drawbar 24 is mounted to the front frame 12 with a ball joint. The position of the drawbar 24 is controlled by three hydraulic cylinders, commonly referred to as a right lift cylinder 28, a left lift cylinder 30, and a center shift cylinder 32. A coupling, shown generally at 34, connects the three cylinders 28, 30, and 32 to the front frame 12. The coupling 34 can be moved during blade repositioning but is fixed stationary during earthmoving operations. The height of the blade 16 with respect to the surface of earth 11 below the motor grader 10, commonly referred to as the blade height, is controlled primarily with the right lift cylinder 28 and the left lift cylinder 30. Each lift cylinder, 28 and 30, functions to raise and lower the associated end of the blade 16. Thus, the right lift cylinder 28 raises and lowers the right end of blade 16. The center shift cylinder 32 moves the drawbar 24 from side to side relative to the front frame 12.

The drawbar 24 includes a large, flat plate commonly referred to as a yoke plate 36, as shown in FIG. 2. Beneath the yoke plate 36 is a large gear, commonly referred to as a circle 38. The circle 38 is rotated by a hydraulic motor commonly referred to as a circle drive 40, as shown in FIG. 1. Rotation of the circle 38 by the circle drive 40 pivots the blade 16 about an axis A fixed to the drawbar 24. The blade 16 is mounted to a hinge (not shown) on the circle 38 with a bracket (not shown). A hydraulic blade tip cylinder 46 is used to pitch the bracket forward or rearward and thus pitch the top 15 of the blade 16 forward and rearward relative to the cutting edge 17. The blade 16 is mounted to a sliding joint in the bracket allowing the blade 16 to be slid or shifted from side to side with respect to the bracket. A hydraulic side shift cylinder 50, shown in FIG. 2, is used to control the side to side shift of the blade 16.

Referring now to FIG. 2, a right articulation cylinder, shown generally at 52, is mounted to the right side of the rear frame 14 and a left articulation cylinder, shown generally at 54, is mounted to the left side of the rear frame 14. The right and left articulation cylinders 52 and 54 are hydraulic and used to rotate the front frame 12 about an axis B shown in FIG. 1. The axis B is commonly referred to as the articulation axis. In FIG. 2, the motor grader 10 is positioned in a neutral or zero articulation angle. The rear tires 19 are driven by a differential (not shown) as is well known in the art. Adjacent the front tires is a hydraulic right steering cylinder 82 and a hydraulic left steering cylinder 84. The right steering cylinder 82 and the left steering cylinder 84 are used to control the position of front tires 18 and thus steer motor grader 10. In a conventional motor grader 10 rotation of the steering wheel 80 is used to actuate the right steering cylinder 82 and the left steering cylinder 84. As would be understood by one of ordinary skill in the art, the front tires 18 could be rotated using only a single steering cylinder mounted to either the left or the right front tire 18.

Figure 3:
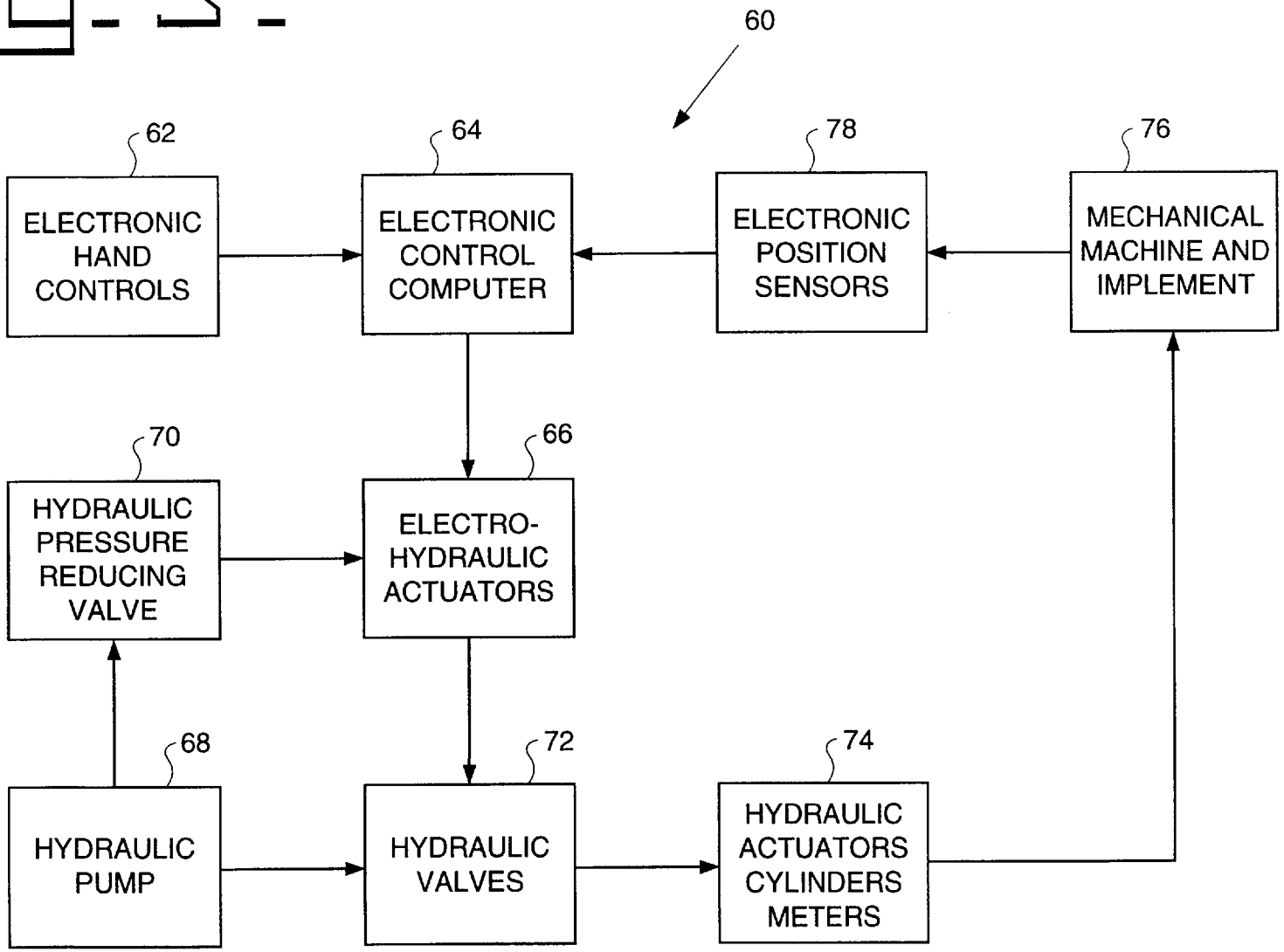
FIG. 3 is a schematic block diagram of an electro-hydraulic control system for the motor grader.

FIG. 3 is a schematic block diagram of an electro-hydraulic control system 60 for the motor grader 10. The control system 60 is designed to operate the various hydraulic controls of the motor grader 10 described above. The system 60 includes a plurality of electronic hand controls represented by block 62, which transform the actions of an operator□s hands on controls such as a control lever 86 (see FIG. 4) into a plurality of electrical input signals. These input signals carry operational information to an electronic control computer, represented by block 64.

The control computer 64 receives the electrical input signals produced by the hand controls 62, processes the operational information carried by the input signals, and transmits control signals to a plurality of drive solenoids, each of which is located in an electro-hydraulic actuator, represented by block 66.

The hydraulic portion of the control system 60 requires both high hydraulic pressure and low pilot pressure. High hydraulic pressure is provided by a hydraulic pump, represented by block 68. The hydraulic pump 68 receives a rotary motion, typically from the engine 21 of the motor grader 10, and produces high hydraulic pressure. Low pilot pressure is provided by a hydraulic pressure reducing valve, represented by block 70. The hydraulic pressure reducing valve 70 receives high hydraulic pressure from the hydraulic pump 68 and supplies low pilot pressure to the electro-hydraulic actuators 66.

Each electro-hydraulic actuator 66 includes an electrical drive solenoid and a hydraulic valve. The solenoid receives control signals from the electronic control computer 64 and produces a controlled mechanical movement of a core stem of the actuator 66. The hydraulic valve receives both the controlled mechanical movement of the core stem of the actuator 66 and low pilot pressure from the hydraulic pressure reducing valve 70 and produces controlled pilot hydraulic pressure for hydraulic valves, represented by block 72.

The hydraulic valves 72 receive both controlled pilot hydraulic pressure from the electro-hydraulic actuators 66 and high hydraulic pressure from the hydraulic pump 68 and produce controlled high hydraulic pressure for hydraulic actuators, cylinders, and motors, represented by block 74.

The hydraulic actuators, cylinders, and motors 74 receive controlled high hydraulic pressure from the hydraulic valves 72 and produce mechanical force to move the front frame 12 of the grader 10 and several mechanical linkages, represented by block 76. As described above, movement of the front frame 12 of the grader 10 with respect to the rear frame 14 of the grader 10 establishes the articulation angle. Movement of the mechanical linkages establishes the position of the blade 16 or other implements.

Each hydraulic actuator, cylinder, and motor 74, such as the lift cylinders 28 and 30 and the circle drive motor 40, includes an electronic position sensor, represented by block 78. The electronic position sensors 78 transmit information regarding the position of its respective hydraulic actuator, cylinder, or motor 76 to the electronic control computer 64. In this manner, the control computer 64 can, for example, determine the articulation angle of the grader 10 and position the blade 16. With such information, the control computer 64 can perform additional operations.

Figure 4:
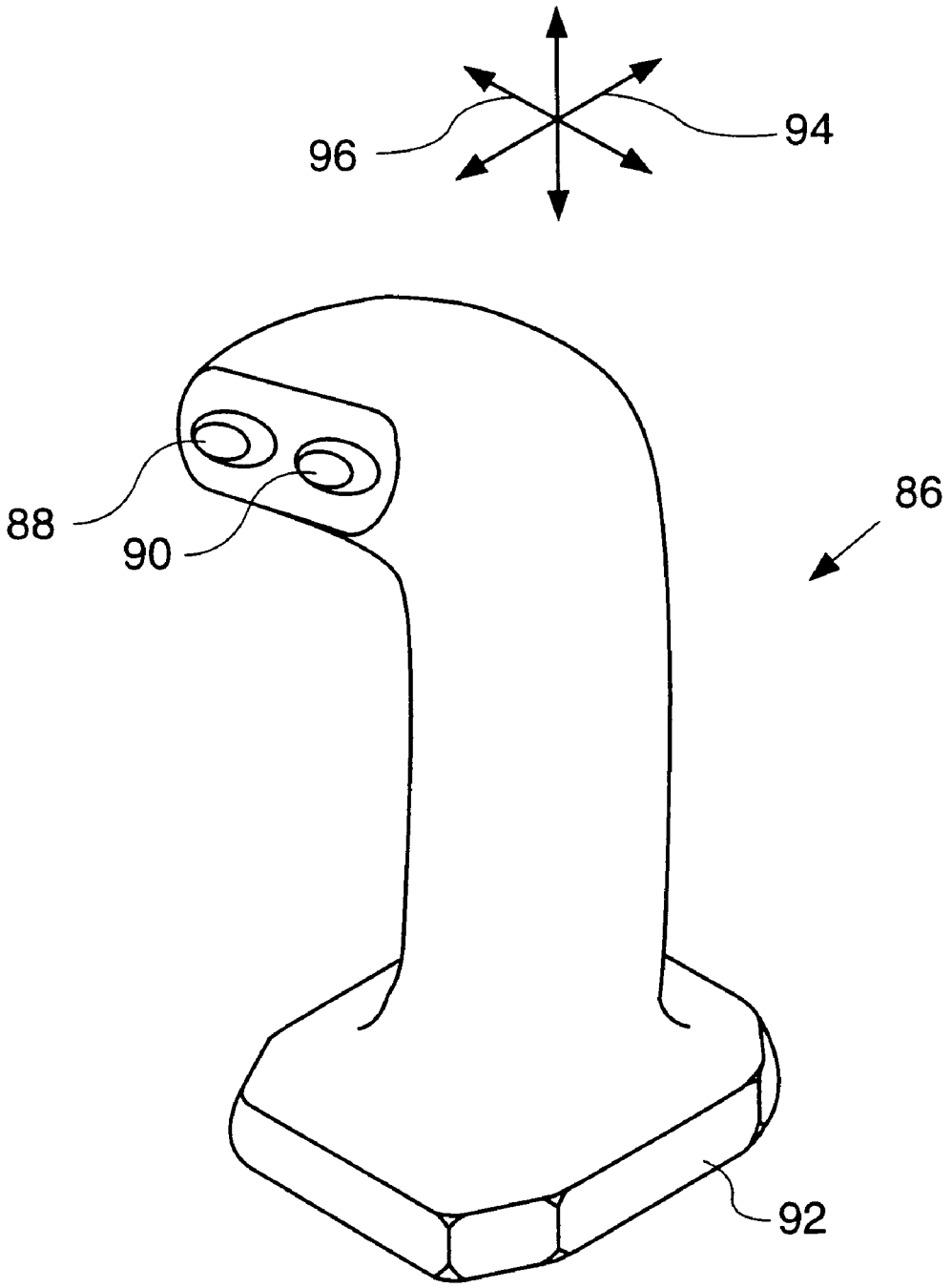
FIG. 4 is a side perspective of a control lever and steering mechanism designed in accordance with the present invention.

In FIG. 4 a control lever is generally shown at 86. Control lever 86 includes a first button 88 and a second button 90. Control lever 86 extends from a mounting base 92. Control lever 86 is movable along a first axis 94 and a second axis 96, which is generally perpendicular to the first axis 94. Control lever 86 is also rotatable about a third axis 98 that is perpendicular to the first axis 94 and the second axis 96. Control lever 86 can also be moved along axes that are intermediate between first axis 94 and second axis 96.

The hydraulic right steering cylinder 82 and the hydraulic left steering cylinder 84 are controlled through the electro-hydraulic control system 60 and the first button 88 and the second button 90 on the control lever 86. Both the hydraulic right steering cylinder 82 and the hydraulic left steering cylinder 84 are each associated with one of the electro-hydraulic actuators 66.

Pressing the first button 88 transmits a first electronic input signal to the electronic control computer 64. The electronic control computer 64 then transmits a first control signal to the electro-hydraulic actuators 66 associated with the hydraulic right steering cylinder 82 and the hydraulic left steering cylinder 84 in response to the first electronic input signal. The first control signal actuates the electro-hydraulic actuators 66 associated with the hydraulic right steering cylinder 82 and the hydraulic left steering cylinder 84. Actuation of these electro-hydraulic actuators 66 causes hydraulic right steering cylinder 82 and hydraulic left steering cylinder 84 to rotate the pair of front tires 18 a first direction. As long as the first button 89 is held down the hydraulic right steering cylinder 82 and hydraulic left steering cylinder 84 continue to rotate the pair of front tires 18 in the first direction. The front tires 18 maintain their rotated orientation until moved by either rotating the steering wheel 80 or pressing the first button 89 or second button 90.

Pressing the second button 90 transmits a second electronic input signal to the electronic control computer 64, which then transmits a second control signal to the electro-hydraulic actuators 66 associated with the hydraulic right steering cylinder 82 and the hydraulic left steering cylinder 84. The second control signal actuates the electro-hydraulic actuators 66 associated with the hydraulic right steering cylinder 82 and the hydraulic left steering cylinder 84 to cause them to rotate the pair of front tires 18 a second direction opposite to the first direction. As long as the first button 90 is held down the hydraulic right steering cylinder 82 and hydraulic left steering cylinder 84 continue to rotate the pair of front tires 18 in the second direction. The front tires 18 maintain their rotated orientation until moved by either rotating the steering wheel 80 or pressing the first button 89 or second button 90. Thus, an operator can steer the motor grader 10 with out needing to remove a hand from an implement control lever to rotate the steering wheel 80. The steering wheel 80 can still be used as described below.

As described above, the control lever 86 is movable along the first axis 94, the second axis 96, and the third axis 98. Movement of control lever 86 along the first axis 94, the second axis 96, the third axis 98 transmits an electrical input signal to the electronic control computer 64. Movement of control lever 86 along an axis intermediate to the first axis 94 and the second axis 96 produces a combination electrical input signal that reflects proportionally the angle of movement of the control lever 86 between the first axis 94 and the second axis 96. The electronic control computer 64 then transmits a control signal to at least one of the electro-hydraulic actuators 66. As described above, actuating one of the electro-hydraulic actuators 66 actuates either a hydraulic cylinder, a hydraulic motor, or a hydraulic actuator 74 such as the blade tip cylinder 46.

Industrial Applicability

The present invention relates generally to a steering system for a motor grader 10. The steering system comprises a dual steering system wherein the direction of travel of the motor grader 10 can be controlled by either of two separate mechanisms. The first mechanism comprises a typical steering wheel 80 that is connected to the right steering cylinder 82 and the left steering cylinder 84 through a hydraulic steering valve. Rotation of the steering wheel 80 in a first direction causes right steering cylinder 82 and left steering cylinder 84 to rotate the front tires 18 of motor grader 10 a first direction. Rotation of steering wheel 80 in a second direction opposite the first direction causes right steering cylinder 82 and left steering cylinder 84 to rotate front tires 18 in a second direction opposite the first direction. The second means of controlling steering of the motor grader 10 comprises a control lever 86 having a first button 88 and a second button 90. The first button 88 and second button 90 are connected to an electro-hydraulic control system 60. Activation of either first button 88 or second button 90 transmits a first electrical input signal or a second electrical input signal respectively. The electrical input signals are received by an electronic control computer 64. The electronic control computer 64 generates a first control signal and a second control signal in response to the first input signal and the second input signal respectively. The control signals are sent to electro-hydraulic actuators 66 that are associated with the right steering cylinder 82 and the left steering cylinder 84. The control signals cause actuation of the electro-hydraulic actuators 66 which in turn actuates the right steering cylinder 82 and the left steering cylinder 84 to rotate the front tires 18 in a first direction or a second direction. Preferably, control lever 86 is also used to control a plurality of functions of motor grader 10. Thus, the present invention provides a steering control system for a motor grader 10 that permits the motor grader 10 to be steered without requiring an operator to remove a hand from an implement control lever.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

What is claimed is:

1. A steering mechanism for a motor grader comprising:

an electro-hydraulic control system and a control lever having a first button and a second button;

said electro-hydraulic control system comprising an electronic control computer, a plurality of electro-hydraulic actuators, a hydraulic right steering cylinder associated with one of said plurality of electro-hydraulic actuators and a hydraulic left steering cylinder associated with another of said plurality of electro-hydraulic actuators, said hydraulic right steering cylinder and said hydraulic left steering cylinder each connected to one of a pair of front tires of a motor grader;

said first button transmitting a first electronic input signal to said electronic control computer, said electronic control computer transmitting a first control signal to said electro-hydraulic actuators associated with said hydraulic right steering cylinder and said hydraulic left steering cylinder in response to said first electronic input signal;

said first control signal actuating said electro-hydraulic actuators associated with said hydraulic right steering cylinder and said hydraulic left steering cylinder, and said hydraulic right steering cylinder and said hydraulic left steering cylinder rotating said pair of front tires a first direction in response to actuation of said associated electro-hydraulic actuators by said first control signal;

said second button transmitting a second electronic input signal to said electronic control computer, said electronic control computer transmitting a second control signal to said electro-hydraulic actuators associated with said hydraulic right steering cylinder and said hydraulic left steering cylinder in response to said second electronic input signal; and said second control signal actuating said electro-hydraulic actuators associated with said hydraulic right steering cylinder and said hydraulic left steering cylinder, and said hydraulic right steering cylinder and said hydraulic left steering cylinder rotating said pair of front tires a second direction in response to actuation of said associated electro-hydraulic actuators by said second control signal, said second direction opposite said first direction.

2. A steering mechanism for a motor grader as recited in claim 1 wherein said control lever is movable along at least one axis;

movement of said control lever along said at least one axis transmitting a third electrical input signal to said electronic control computer;

said electronic control computer transmitting a third control signal to at least one of said plurality of electro-hydraulic actuators in response to said third electrical input signal; and said third control signal actuating said at least one of said electro-hydraulic actuators, said actuated electro-hydraulic actuator actuating one of a hydraulic cylinder, a hydraulic motor, or a hydraulic actuator.

3. A steering mechanism for a motor grader as recited in claim 1 further including a steering wheel hydraulically connected to said hydraulic right steering cylinder and said hydraulic left steering cylinder;

rotation of said steering wheel a first direction actuating said right steering cylinder and said left steering cylinder to rotate said pair of front tires said first direction; and rotation of said steering wheel a second direction actuating said right steering cylinder and said left steering cylinder to rotate said pair of front tires said second direction.

4. A steering mechanism for a motor grader comprising:

an electro-hydraulic control system and a control lever having a first button and a second button;

said electro-hydraulic control system comprising an electronic control computer, a plurality of electro-hydraulic actuators, a hydraulic right steering cylinder associated with one of said plurality of electro-hydraulic actuators and a hydraulic left steering cylinder associated with another of said plurality of electro-hydraulic actuators, said hydraulic right steering cylinder and said hydraulic left steering cylinder each connected to one of a pair of front tires of a motor grader;

said first button transmitting a first electronic input signal to said electronic control computer, said electronic control computer transmitting a first control signal to said electro-hydraulic actuators associated with said hydraulic right steering cylinder and said hydraulic left steering cylinder in response to said first electronic input signal;

said first control signal actuating said electro-hydraulic actuators associated with said hydraulic right steering cylinder and said hydraulic left steering cylinder, and said hydraulic right steering cylinder and said hydraulic left steering cylinder rotating said pair of front tires a first direction in response to actuation of said associated electro-hydraulic actuators by said first control signal;

said second button transmitting a second electronic input signal to said electronic control computer, said electronic control computer transmitting a second control signal to said electro-hydraulic actuators associated with said hydraulic right steering cylinder and said hydraulic left steering cylinder in response to said second electronic input signal;

said second control signal actuating said electro-hydraulic actuators associated with said hydraulic right steering cylinder and said hydraulic left steering cylinder, and said hydraulic right steering cylinder and said hydraulic left steering cylinder rotating said pair of front tires a second direction in response to actuation of said associated electro-hydraulic actuators by said second control signal, said second direction opposite said first direction;

a steering wheel hydraulically connected to said hydraulic right steering cylinder and said hydraulic left steering cylinder;

rotation of said steering wheel a first direction actuating said right steering cylinder and said left steering cylinder to rotate said pair of front tires said first direction; and rotation of said steering wheel a second direction actuating said right steering cylinder and said left steering cylinder to rotate said pair of front tires said second direction.

5. A steering mechanism for a motor grader as recited in claim 4 wherein said control lever is movable along at least one axis;

movement of said control lever along said at least one axis transmitting a third electrical input signal to said electronic control computer;

said electronic control computer transmitting a third control signal to at least one of said plurality of electro-hydraulic actuators in response to said third electrical input signal; and said third control signal actuating said at least one of said electro-hydraulic actuators, said actuated electro-hydraulic actuator actuating one of a hydraulic cylinder, a hydraulic motor, or a hydraulic actuator.

* * * * *